United States Patent [19]
Blomgren et al.

[11] Patent Number: 5,325,516
[45] Date of Patent: Jun. 28, 1994

[54] PROCESSOR SYSTEM WITH DUAL CLOCK

[75] Inventors: James S. Blomgren, San Jose; Mark Semmelmeyer, Sunnyvale; Tuan Luong; Gary Baum, both of San Jose, all of Calif.

[73] Assignee: Chips and Technologies Inc., San Jose, Calif.

[21] Appl. No.: 848,544

[22] Filed: Mar. 9, 1992

[51] Int. Cl.$^5$ .............................................. G06F 13/00
[52] U.S. Cl. .................................................. 395/550
[58] Field of Search ......................... 395/275, 550, 425

[56] References Cited

U.S. PATENT DOCUMENTS 3,703,707 11/1972 Bovett ................................. 395/550
5,179,667 1/1993 Iyer ..................................... 395/275

OTHER PUBLICATIONS

PC Magazine, vol. 11, No. 3, p. 113, Feb. 11, 1992.
PC Magazine, vol. 10, No. 16, p. 37, Sep. 24, 1991.
PC Week, vol. 8, No. 40, p. 12, Oct. 7, 1991.

Primary Examiner—Robert L. Richardson
Attorney, Agent, or Firm—Elmer Galbi

[57] ABSTRACT

The present invention provides a means for operating the CPU in a single chip microprocessor at a multipe of the cycle speed of the memory bus. With the present invention, first and second timing signals are provided. The frequency of the second timing signal is a multiple of the frequency of the first timing signal. The second or fast timing signal is provided to the CPU and the first or slower timing signal is provided to the memory subsystem. A bus interface unit is interposed between the CPU and the memory bus. This bus interface unit receives the RDY signal (i.e. the ready signal) from the memory subsystem and modifies it before it is provided to the CPU. The "ready" signal from the memory subsystem is in an undefined state for a significant portion of each bus cycle. Since at least two CPU cycles occur during each memory access, the bus interface unit must ensure that the CPU does not misinterpret the ready signal from the memory subsystem. The bus interface unit also must modify the ADS signal (i.e. the address status signal) generated by the CPU. The ADS and RDY signals must be modified in a first way if the CPU calls for a memory cycle at the beginning of a bus cycle and in a second way if the CPU calls for a memory cycle in the middle of a CPU cycle. The use of a CPU clock speed doubler in combination with a write-back cache achieves truly synergistic increases in system speed.

6 Claims, 6 Drawing Sheets

PROCESSOR SYSTEM WITH DUAL CLOCK

FIELD OF THE INVENTION

The present invention relates to electronic computers and more particularly to circuitry for timing the operation of computer systems that include single chip microprocessors.

BACKGROUND OF THE INVENTION

The iAPX family of single chip microprocessors is widely used in personal computers. Microprocessors termed the 8086, 80286, 80386 and 80486 are members of the iAPX family of microprocessors. Microprocessors in the iAPX 86 family are commercially available from a number of vendors including Nippon Electric Corporation (generally known as NEC), Advanced Micro Devices Corporation (generally known as AMD), Intel Corporation, and Chips and Technologies Incorporated.

Microprocessors in the iAPX family require an external clock signal and microprocessors are generally sold with a specification concerning the speed at which the particular microprocessor can operate. Microprocessors which can operate at 16, 20, 25, 33, and 40 MHz are widely available.

The iAPX family of single chip microprocessors are designed to operate with a synchronous input-output bus. That is, the clock cycle for the memory and the memory bus are synchronized with the operation of the CPU. Thus, if the CPU is operating at 33 MHz, the memory and the memory bus also operate at 33 MHz.

The present invention provides a system where the CPU operates at a multiple of the speed of the memory and memory bus. The present invention is particularly useful with the 486 family of microcomputers because the 486 microcomputers include a memory cache on the microprocessor chip.

Two broad categories of memory caches are known. The first type of cache is termed a write-thru cache. With a write-thru cache, each time data is written from the CPU to memory the cache memory is updated and the data is written over the memory bus to the main memory. The second type of cache is termed a write-back cache. With a write-back cache, when the CPU modifies data which is stored in the cache, the data is written back into the cache, but this data is not written to the main memory until the data in the cache is displaced by more recently accessed data.

The present invention takes particular advantage of the characteristics of a write-back cache to achieve improved performance. The combination of doubling the CPU clock and providing a write-back cache is truly synergistic. If the memory bus of a system is in use fifty percent of the time in a system where the memory system and CPU are operating at the same clock speed, it is not possible to double the clock speed of the CPU and assume that the memory bus will be in use one hundred percent of the time. Among the reasons for this is that the bus may be in the middle of a cycle rather than at the beginning of a cycle when the CPU calls for an input-output cycle. If the bus is in the middle of a bus cycle when the CPU calls for an I-O cycle the CPU must wait until the beginning of the next bus cycle. Such waiting reduces the benefit one might expect from doubling the clock speed.

In a 486 microprocessor, which has a write-thru cache, the bus utilization is about fifty percent. If one makes a simple calculation of bus utilization in a system where (a) the CPU clock rate is twice the bus clock rate, (b) the system includes a write-thru cache, and (c) the CPU is operating at 100%, one would project a bus utilization or demand of about 110 to 120 percent. Naturally, in most practical applications, bus demand is not steady, but the point is that in the situation described above, the projected demand would exceed one hundred percent and the system would be bus limited. Stated differently, since at most, the bus can be used 100 percent of the time, in such a system the CPU will of necessity have to wait for the bus and therefore the CPU will operate less than 100 percent of the time.

In a 486 system where the CPU and the bus are operating at the same speed, if the write-thru cache is replaced by a write-back cache, bus utilization will be about fourteen percent. If the present invention is used to double the CPU clock speed, the bus utilization will go to approximately thirty five percent. Thus by both doubling the CPU speed and using a write-back cache, the present invention achieves its true potential relative to increased CPU speed.

SUMMARY OF THE INVENTION

The present invention provides a means for operating the CPU in a single chip microprocessor at a multiple of the cycle speed of the memory bus. With the present invention, first and second timing signals are provided. The frequency of the second timing signal is a multiple of the frequency of the first timing signal. The second or fast timing signal is provided to the CPU and the first or slower timing signal is provided to the memory subsystem. A bus interface unit is interposed between the CPU and the memory bus. This bus interface unit receives the RDY signal (i.e. the ready signal) from the memory subsystem and modifies it before it is provided to the CPU. The "ready" signal from the memory subsystem is in an undefined state for a significant portion of each bus cycle. Since at least two CPU cycles occur during each memory access, the bus interface unit must ensure that the CPU does not misinterpret the ready signal from the memory subsystem. The bus interface unit also must modify the ADS signal (i.e. the address status signal) generated by the CPU. The ADS and RDY signals must be modified in a first way if the CPU calls for a memory cycle at the beginning of a bus cycle and in a second way if the CPU calls for a memory cycle in the middle of a CPU cycle. The use of a CPU clock speed doubler in combination with a write-back cache achieves truly synergistic increases in system speed.

DETAILED DESCRIPTION

Figure 1A:
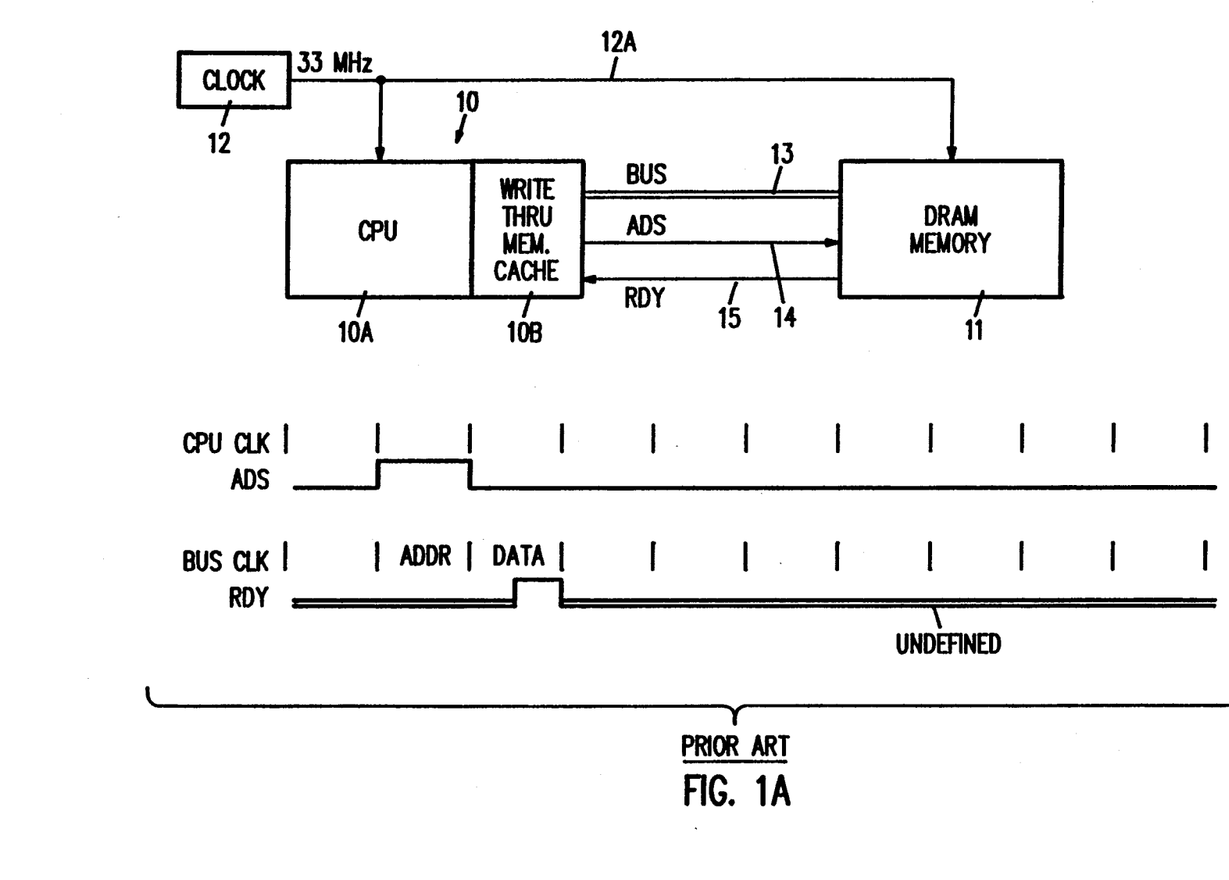
FIG. 1A is a diagram of the prior art.

Single chip 486 microprocessors are described in a wide variety of published literature. For example, see a publication entitled "i486 Microprocessor Hardware Reference Manual" which is publicly available from Intel Corporation. The parts of a 486 system that are relevant to the present invention are shown in FIG. 1A. The units of interest are single chip microprocessor 10, DRAM memory 11 and 33 MHz crystal clock 12. Both the microprocessor 10 and the memory 11 are driven by output 12A of clock 12. In the example shown clock 12 produces a 33 MHz signal on line 12A; however, it should be recognized that this is merely an example and processors operating at other clock frequencies are also commercially available.

Single chip 486 microprocessor 10 includes CPU 10A and a write thru memory cache 10B. Memory bus 13 connects the cache 10B to the memory 11. When the microprocessor 10 wants to access a particular location in the memory 11, microprocessor 10 activates ADS line 14 and provides an address on the memory bus 13. When the memory system 11 has accessed the appropriate location in memory it indicates that it is ready to store data or that the requested data is on the memory bus 13 by activating RDY line 15.

The timing diagrams below FIG. 1A show the following signals:
a) The CPU clock (CPU CLK),
b) The bus clock (BUS CLK),
c) The ADS line, and
d) The ready line (RDY).

It is important to note that the CPU clock and the Bus clock coincide. When the microprocessor wants to either write or read data to or from memory 11, the microprocessor activates ADS line 14 and in the same cycle, it places the address to be read or written on memory bus 13. In the next bus cycle the data appears on bus 13 and the memory activates the RDY line. The specific details of the ADS and RDY signal such as the setup time (i.e. the time before a clock edge that everything must be set) are explained in the above referenced manual and such explanation is hereby incorporated by reference. Details concerning the specific characteristics of control and bus signals is also described in a commercially available book entitled "AT BUS DESIGN" by Edward Solari, published by Annabooks 1991 (ISBN 0-929392-08-6).

In order to properly interpret the timing diagrams in FIGS. 1A (and in the other Figures), it should be noted that the ADS signal is always be valid, whereas the RDY signal is only valid during the second part (i.e. the data part) of a bus cycle. The indeterminate state of the RDY signal during bus cycles when no data is on the bus is shown in the Figures by the double line. The CPU ignores the state of the RDY line during a CPU cycle when the ADS line is activated. Furthermore the CPU is only sensitive to the rising edge of the RDY signal. The above referenced manuals explain the fact that the CPU is sensitive to the rising edge of the RDY signal and the fact that the RDY line is in an indeterminate state except a certain specific times.

Figure 1B:
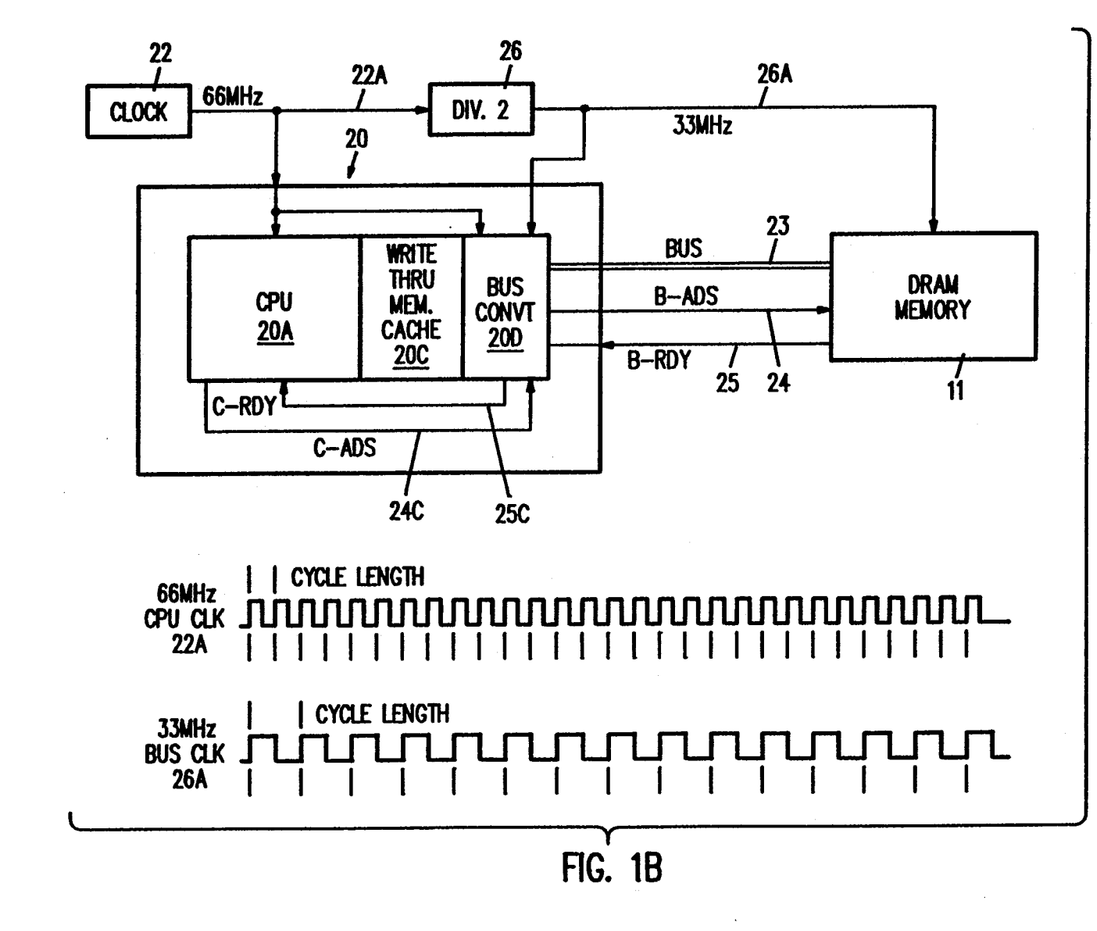
FIG. 1B is a block diagram of a first embodiment of the present invention.
Figure 2A:
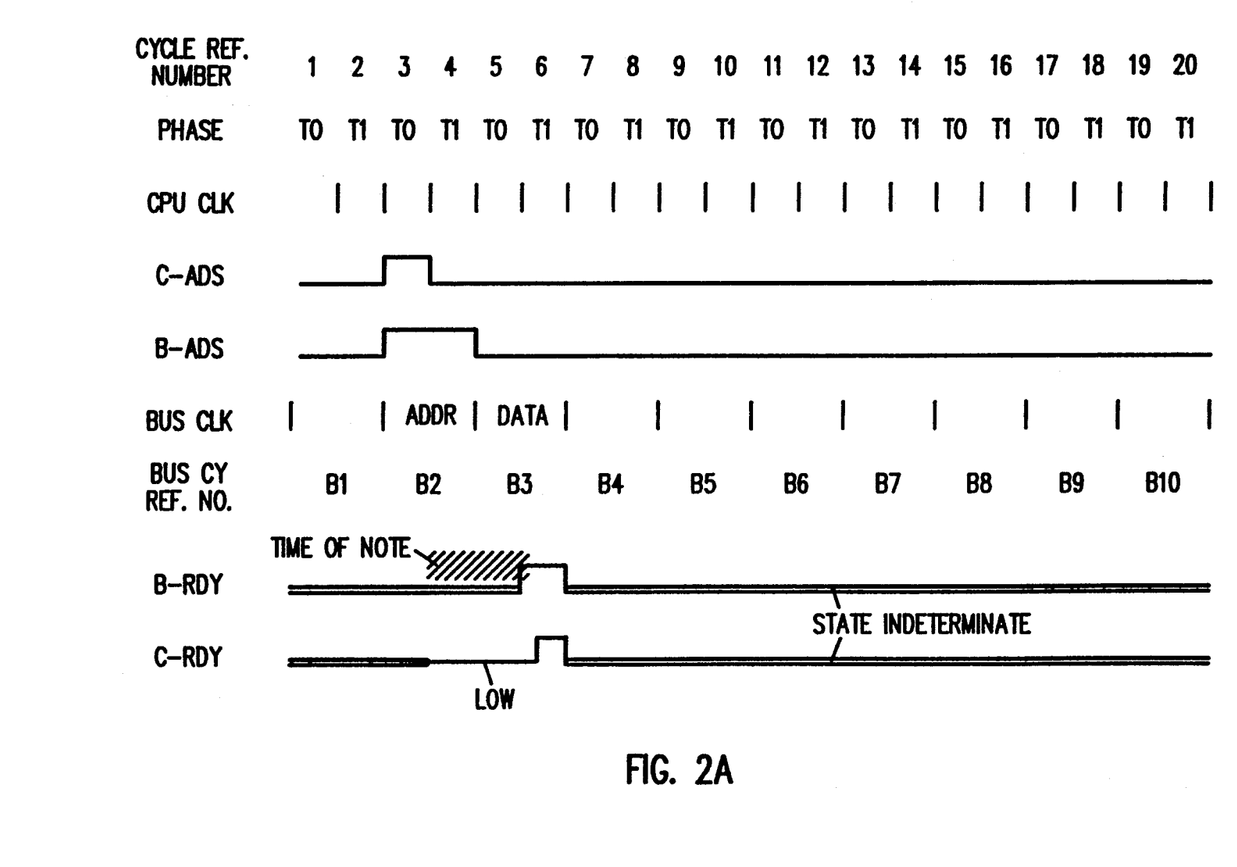
FIGS. 2A and 2B are timing diagrams related to the embodiment of the invention shown in FIG. 1B.

FIG. 1B is a block diagram of a first embodiment of the present invention. This embodiment of the invention includes a 486 microprocessor 20 which includes a CPU 20A, a write-thru cache 20C and a bus conversion unit 20D. (A second embodiment which includes a write-back cache is described later). The DRAM memory 11 is identical to the Dram Memory 11 shown in FIG. 1A. Likewise Bus 23, B-ADS line 24 and B-RDY line 25 shown in FIG. 2A are identical to the corresponding lines 13, 14 and 15 shown in FIG. 1A. The write-thru cache 20C is a conventional write-thru cache which stores pages of the most recently used data so that a bus access cycle is not required each time the processor desires to access data. With a write-thru cache, each time the CPU writes data to the cache, the data is also sent over bus 23 so that the contents of DRAM Memory 11 are always in an updated state and the memory management unit (not shown) does not have to keep track of what data in the cache is more current than data in the Dram Memory 11. The system shown in FIG. 1B also includes a C-ADS line 24C which is activated by the CPU 20A each time access to memory 11 is required (that is, when desired data is not in the cache or when data is to be written to memory 11). Likewise there is a C-RDY line 25C which is activated when the desired data is on the bus 23 in a state where it can be read or accepted by CPU 20A. The bus conversion unit 20D (which can also be termed a bus interface unit) generates the B-ADS signals on line 24 and the C-RDY signal on line 25C and it accepts signals C-ADS on line 24C and B-RDY on line 25.

Clock 22 in FIG. 1B operates at 66 MHz (in contrast to the 33 Mhz of clock 12 shown in FIG. 1A). Output of clock 22 goes to both microprocessor 20 and to "divide by two" circuit 26. Divide by two circuit 26 generates a 33 MHz signal on line 26A. As shown by the timing diagram on the bottom of FIG. 1B, the 66 MHz CPU clock (CPU CLK) is synchronized with and double the frequency of the 33 MHz memory and Bus clock (BUS CLK). The cycle length and synchronization of the Bus and CPU clocks are shown by the timing diagrams in FIG. 1B. It should be noted that the timing diagrams at the bottom of FIG. 1B show the actual clock outputs whereas the corresponding diagrams in FIGS. 2A and 2B only show lines that represent the beginning and end of each clock cycle.

FIG. 2A is a timing diagram that shows 20 representative cycles of the clock 22.
a) The particular cycles shown are labeled on the first row of FIG. 2A.
b) The second line of the FIG. divides the cycles into a series of cycles labeled T0 and T1.
c) The third line of FIG. 1A shows the beginning and end of each cycle.
d) The fourth line shows a C-ADS signal occurring during the cycle labeled "3".
e) The bus clock cycles are shown on the line labeled BUS CLK.
f) The Bus cycles are labeled B1 to B10 on the next line of the Figure.
g) The B-RDY and the C-RDY signals are shown on the next lines of the Figure. C-RDY is shorter than B-RDY since C-RDY is matched to the CPU clock cycle length and B-RDY is generated in response to the bus clock cycle length. (Note the figures are not exact representations of the length of these pulses since only the pulse edges are detected and since within a CPU cycle the signals act as described in the above references).

The indeterminate state of the B-RDY line and the indeterminate state of the C-RDY line is illustrated in the Figures by means of a double line. With respect to the present invention, an important point is that while at certain times (such as cycles "4" and "5" in FIG. 2A) the CPU is ready to accept data, the C-RDY line is "off" so that the CPU will not try to read data from the bus.

As shown in FIG. 2A, the memory address is on the bus during bus cycle B2 which corresponds to CPU cycles "3" and "4". The data is on the bus during bus cycle B3 which corresponds to CPU cycles "5" and "6". It should be noted that (1) the pulse on the B-ADS line is longer than the C-ADS pulse (2) there is a period where the B-RDY signal is in an indeterminate state and where the C-RDY signal is in a low state to prevent the CPU from reading data from the bus. After the CPU issues a C-ADS signal, the B-RDY line is in the indeterminate state for more than one entire cycle of the CPU. In the example shown in FIGS. 2A the indeterminate state covers the cycles numbered "3, 4 and 5" (see the shaded area labeled "time of note"). The signal is indeterminate during cycle "3" because this is the cycle during which C-ADS is active and it is "normal" for the RDY to be indeterminate during such a cycle. A key point is that the B-RDY line is also indeterminate during cycles "4" and "5". During cycles "4" and "5" the CPU can be expected to be looking for data on the bus since these cycles follow the cycle during which a C-ADS signal was issued. The C-RDY line must be forced to an inactive or "off" state during cycles "4" and "5" to prevent the CPU from misinterpreting what appears on the bus.

Figure 2B:
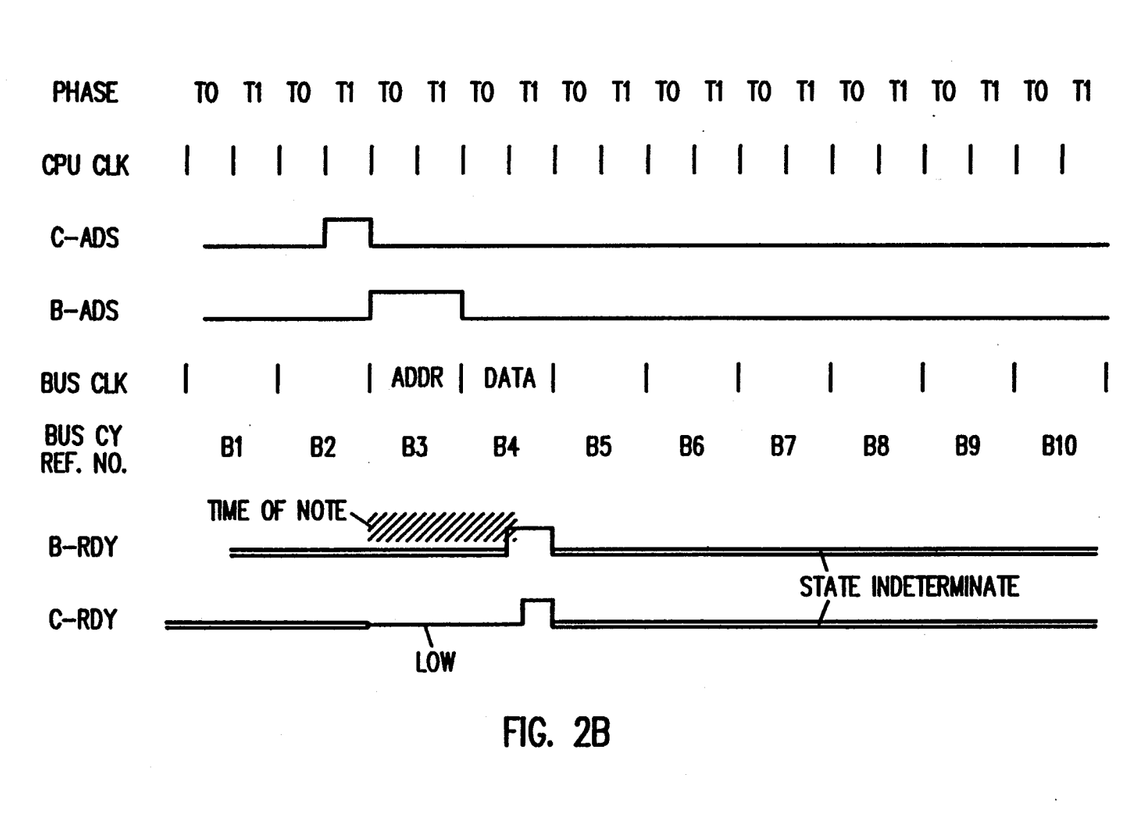

FIG. 2B is similar to FIG. 2A except that in the example shown in FIG. 2B, the processor is attempting to access memory during a T1 cycle, whereas in the example shown in FIG. 2A the processor is accessing memory during a T0 cycle. A T1 CPU cycle does not start at the beginning of a Bus cycle and hence, the B-ADS pulse does not begin until the next CPU cycle. Thus the beginning of the memory access is delayed by one CPU clock pulse. After the CPU issues a C-ADS signal, it waits for a C-RDY signal. When the CPU issues a C-ADS signal during a T1 cycle as shown in FIG. 2B, an entire CPU cycle is therefore lost or wasted before the BUS cycle begins.

If the CPU and the BUS are operating at the same speed, as shown in FIG. 1A, the CPU issues an ADS signal in one clock cycle and the data appears on the BUS (i.e. the RDY signal appears) during the next clock cycle. Thus a memory access requires two clock cycles. With the present invention, in the example shown in FIG. 2A, a memory access requires four CPU clock cycles and with the example shown in FIG. 2B, a memory access requires five CPU clock cycles. Since when the CPU speed is doubled some memory cycles require five CPU cycles, if the bus is in use 50 percent of the time when the bus and processor are operating at the same speed, when the CPU speed is doubled, the speed of the system would be constrained by the speed of the bus and the CPU would be idle for some percentage of time. The second embodiment of the invention described later incorporates a write-back cache, to overcome this limitation.

Figure 3A:
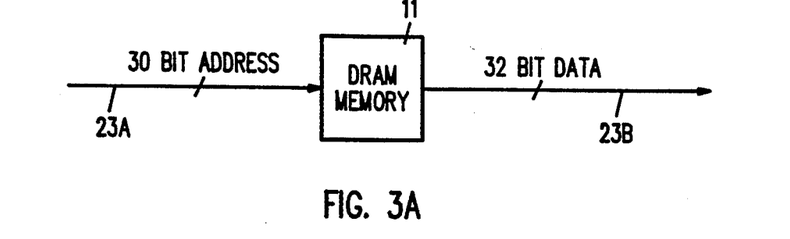
FIG. 3A to 3D are block diagrams of the Bus Interface Unit shown in FIG. 1B.

The details of the memory and of the bus interface unit 20D are shown in FIGS. 3A to 3D. FIG. 3A shows the Dram Memory 11 and the bus 23 which has 30 address bit lines 23A and 32 data bits designated 23B. Lines 23A together with lines 23B constitute bus 23.

Figure 3B:
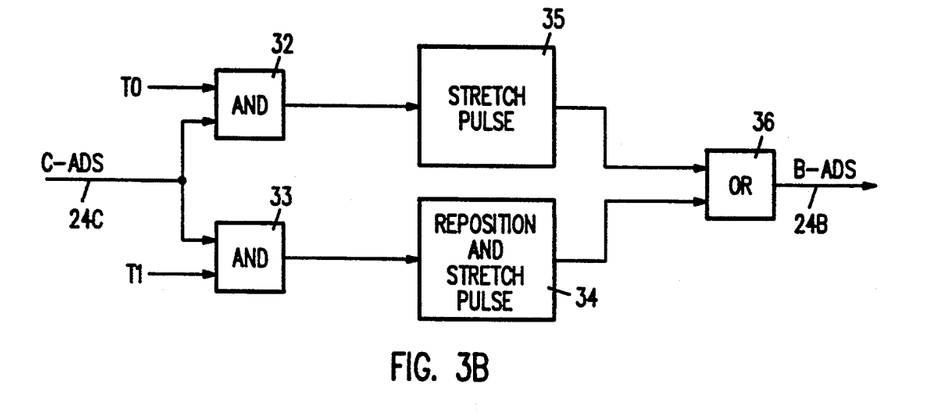

FIG. 3B shows the circuitry used to generate the B-ADS signal from the C-ADS signal. The circuit in FIG. 3B has two paths. The first path which is operable when an ADS signal is generated in a T0 cycle, includes AND circuit 32 and pulse stretching circuit 35. As shown in FIG. 2A, when a memory access cycle occurs during a T0 memory cycle, bus converter unit 20D lengthens the ADS pulse; however, there is no delay in the beginning of the pulse. The second path in the circuit shown in FIG. 3B is operable when a memory access occurs during a T1 cycle. This second path includes AND circuit 33 and circuit 34 which repositions and stretches the pulse. As shown in FIG. 2A when a C-ADS signal is generated during a T1 cycle, the start of the B-ADS signal is delayed until the end of the C-ADS signal and the length of the pulse is increased.

Figure 3C:
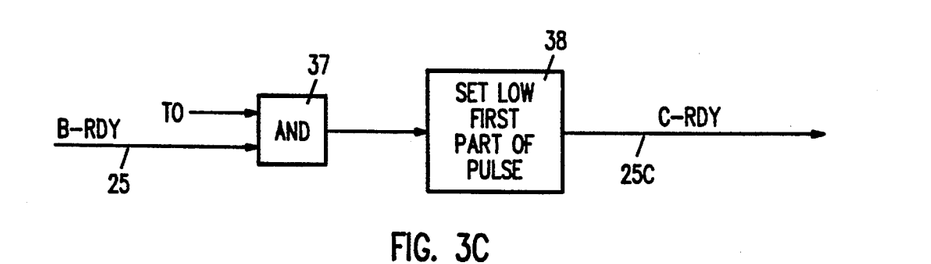

FIG. 3C shows the circuit in bus interface unit 20D which generates the C-RDY signal from the B-RDY signal. As shown in FIG. 2A and 2B, the part of the B-RDY signal that occurs during the first CPU cycle after the start of the data cycle on the bus is "off" or low rather than being indeterminate. The reason for this is that during the data cycle (for example cycle B3) on the bus 23, two CPU cycles take place. As shown in FIG. 2A, during data bus cycle B3, CPU cycles "5" and "6" take place. The status of the bus during the first of these cycles, (cycle 5 in the example) is indeterminate, hence the start of the C-RDY signal must be low or off to prevent the CPU from trying to read data. FIG. 3C only shows a single AND gate 37 and a single path used during a T0 cycle. A second path would provide the pulse active during a T1 cycle. The difference between the paths is the length of the "low" portion of the signals as shown in FIGS. 2A and 2B.

Figure 3D:
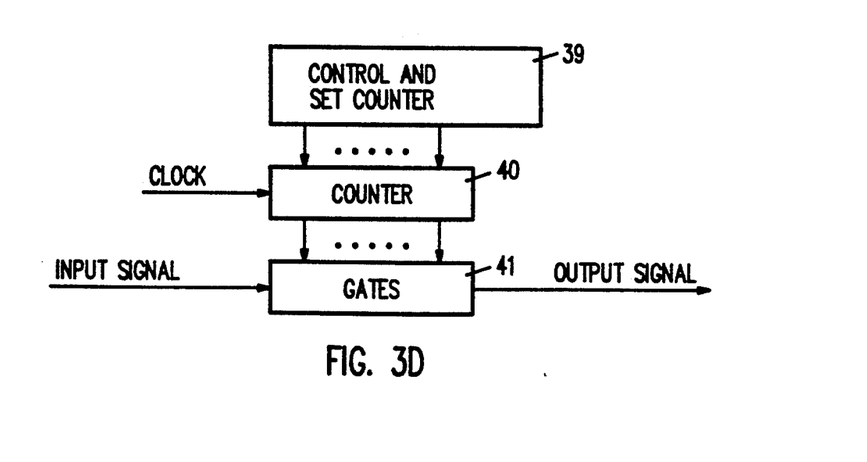

FIG. 3D is an example of how the circuit 34, 35 and 38 may be implemented. It is noted that the implementation of such circuits is well within the state of the art and the example in FIG. 3D is merely given to illustrate the principles involved. The circuit shown in FIG. 3D has control logic 39, a counter 40 and a plurality of gates 41. For example in order to reposition and stretch a pulse, the counter can be a six position counter which would be incremented by the CPU clock signal. When a C-ADS signal occurs the clock would start counting. The gates 41 would not gate a signal to the output during the first two counts of the counter and then they would generate a signal on the output during the next four counts of the counter. Thus the signal on the output would be delayed and stretched.

Figure 4:
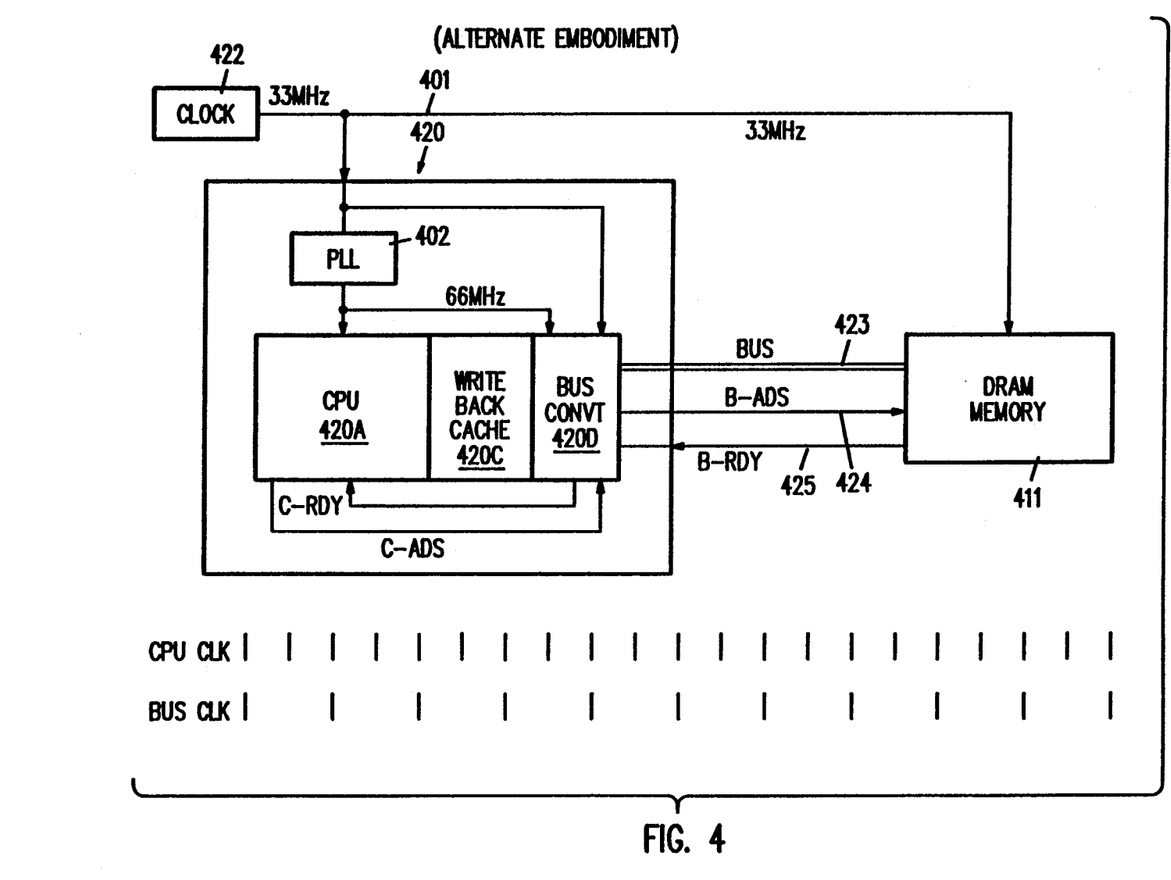
FIG. 4 is a block diagram of an alternate embodiment of the invention.

An alternative embodiment of the invention is shown in FIG. 4. In the embodiment shown in FIG. 4, the write-thru cache 20C has been replaced by a write-back cache 420D. The internal construction of write-back cache 420D and the associated memory management unit (not shown) are conventional. In a write-back cache, when the CPU writes data to the cache, the data is not automatically sent out over the bus to memory 11. Instead data is only written to memory 11, when it needs to be displaced by more recently used data.

In the embodiment shown in FIG. 4, the divide by 2 circuit 26 has been eliminated and the clock 422 generates a 33 MHz signal in contrast to the 66 MHz signal generated by clock 22 shown in FIG. 1B. A phase locked loop (PLL) 402 has been added to the single chip microprocessor 420. A phase locked loop is a well known type of circuit that can accept a signal at one frequency and generate a signal at a different frequency. In this case the phase locked loop 402 accepts a signal at 33 MHz and in turn generates a 66 MHz signal. One advantage of having the phase locked loop 402 on the single chip microprocessor 420 is that external to the microprocessor one only needs circuitry capable of handling a 33 MHz signal.

The embodiment shown in FIG. 4 operates the same as does the previously described embodiment except that, since cache 420C is a write-back cache instead of a write-thru cache, the system is not constrained by the capacity of the bus 423.

As shown herein the CPU operates at 66 MHz while the bus operates at 33 MHz, it should be understood that this is merely an example and other frequencies could be used. Furthermore, as shown herein the CPU frequency is twice the bus frequency, again it should be understood that this is an example and other multiples could be used.

Various other changes could be made to the embodiments shown without departing from the spirit and scope of the applicant's invention. It should be understood that the applicant's invention is limited only by the appended claims.

What is claimed:

1. A computer including,
    memory system operating at a first clock rate, said memory system including a memory bus operating at said first clock rate, an B-ADS control line, activation of which indicates that a memory cycle is desired, and a B-RDY control line, a signal on which indicates that the desired data is on said memory bus, and
    a single chip microprocessor that includes,
    a CPU operating at a multiple of said first clock rate, said CPU generating an C-ADS signal when access to memory is desired and said data is not in said cache, and responsive to a C-RDY line to accept data from said memory bus,
    a memory cache for storing data required by said CPU, and
    a bus interface unit which includes, means for transforming said B-RDY signal to said C-RDY signal and means for transforming said C-ADS signal into said B-ADS signal,
    whereby said CPU can operate at a speed which is a multiple of the speed of said memory system.

2. The system recited in claim 1 wherein said microprocessor includes a write-back cache, whereby said CPU is not constrained by the capacity of said bus.

3. The system recited in claim 1 wherein said first clock rate is 33 MHz and said second clock rate is 66 MHz.

4. The system recited in claim 3 wherein said microprocessor includes a write-back cache.

5. The system recited in claim 1 wherein said C-ADS signal generated by said CPU is shorted than said B-ADS signal required by said memory system and wherein said B-RDY signal is longer than said C-RDY signal.

6. A system including,
    a memory system operating at a first speed, said memory system including a memory bus operating at said first speed, said memory system have a plurality of control signal lines including a first control line which is activated when access to memory system is desired and a second control line which indicates that said memory system has provided data on said memory bus,
    a single chip microprocessor operating at a second speed, said second speed being a multiple of said first speed, said single chip microprocessor having a plurality of memory control signal lines including (1) a control line which is activated to indicate that said CPU desires access to said memory system and (2) a control line which is activated to indicate that said CPU can accept data which is on said bus, and
    a bus interface unit connecting said single chip microprocessor to said memory system and for modifying said control signals from said memory to conform to the control signal of said single chip microprocessor and for modifying the control signals from said microprocessor to conform to the control signals of said memory system.

* * * * *